(No Model.) 6 Sheets—Sheet 1.

L. D. HOWARD.
CONVEYER.

No. 538,111. Patented Apr. 23, 1895.

Witnesses
Marcus L. Byng.
Marcus B. May.

Inventor
Lyman D. Howard
by Doubleday & Bliss
Attorneys

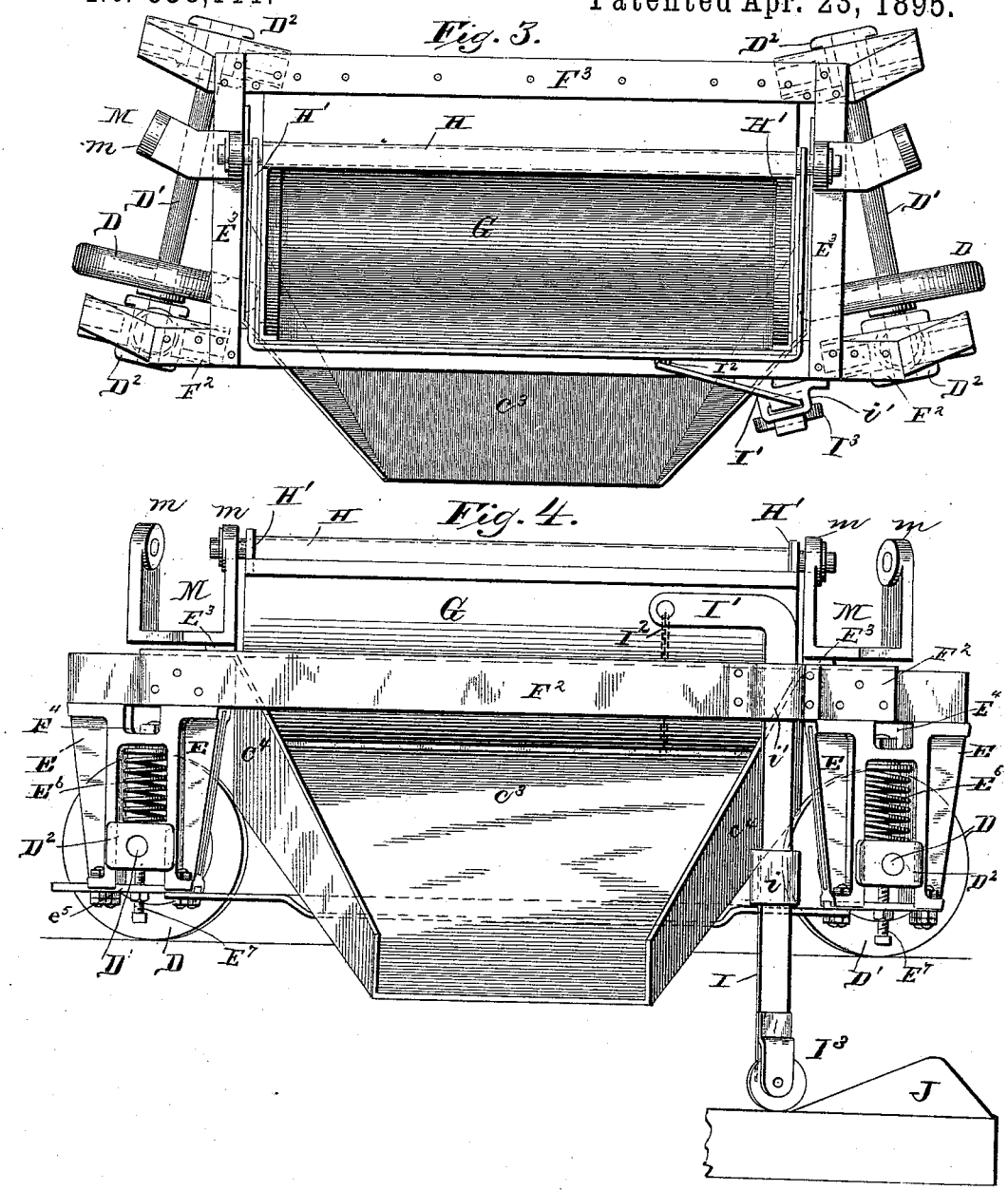

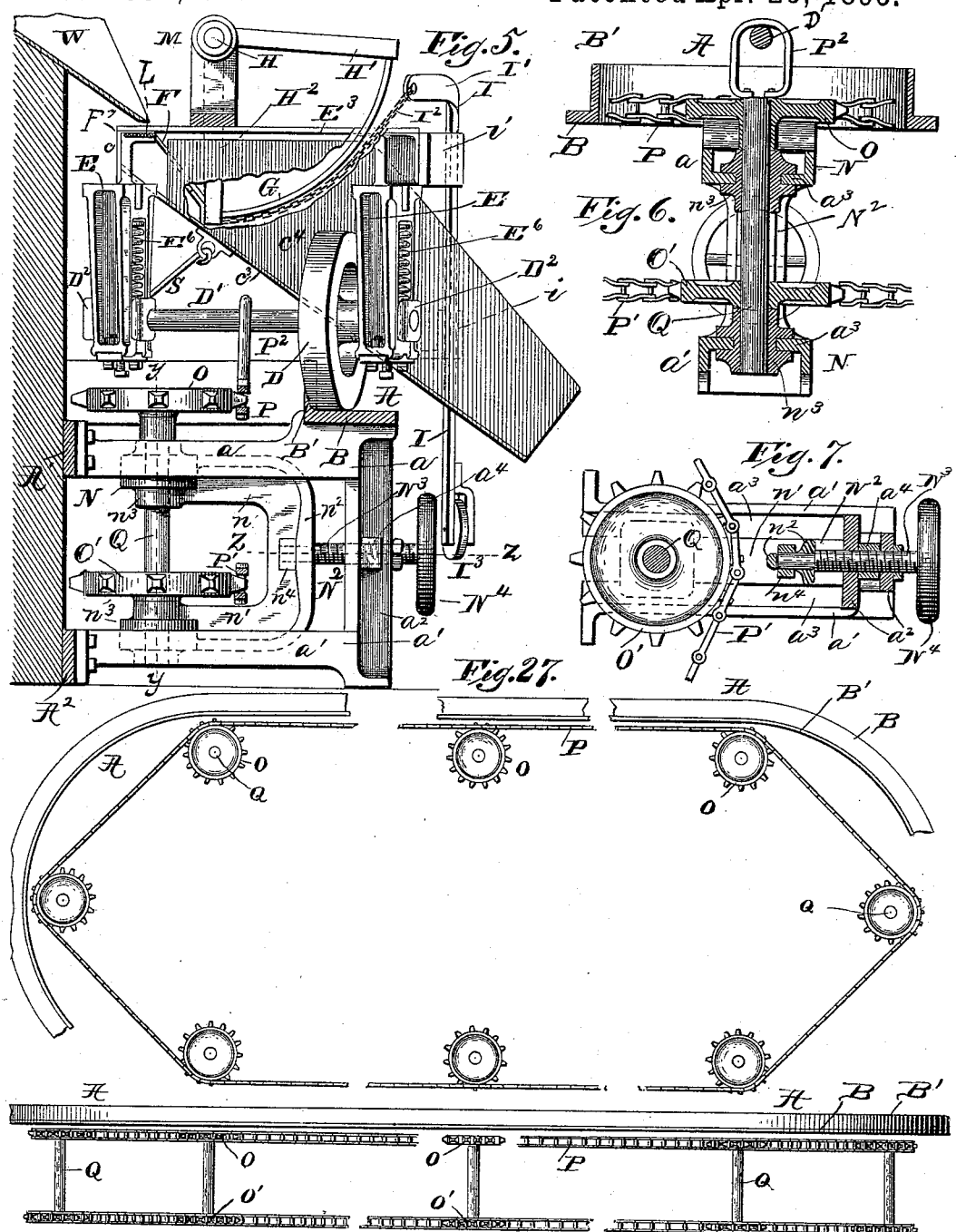

(No Model.) 6 Sheets—Sheet 4.

L. D. HOWARD.
CONVEYER.

No. 538,111. Patented Apr. 23, 1895.

Witnesses
Marcus L. Byng
Marcus B. May

Inventor
Lyman D. Howard
by Doubleday & Bliss
Attorneys

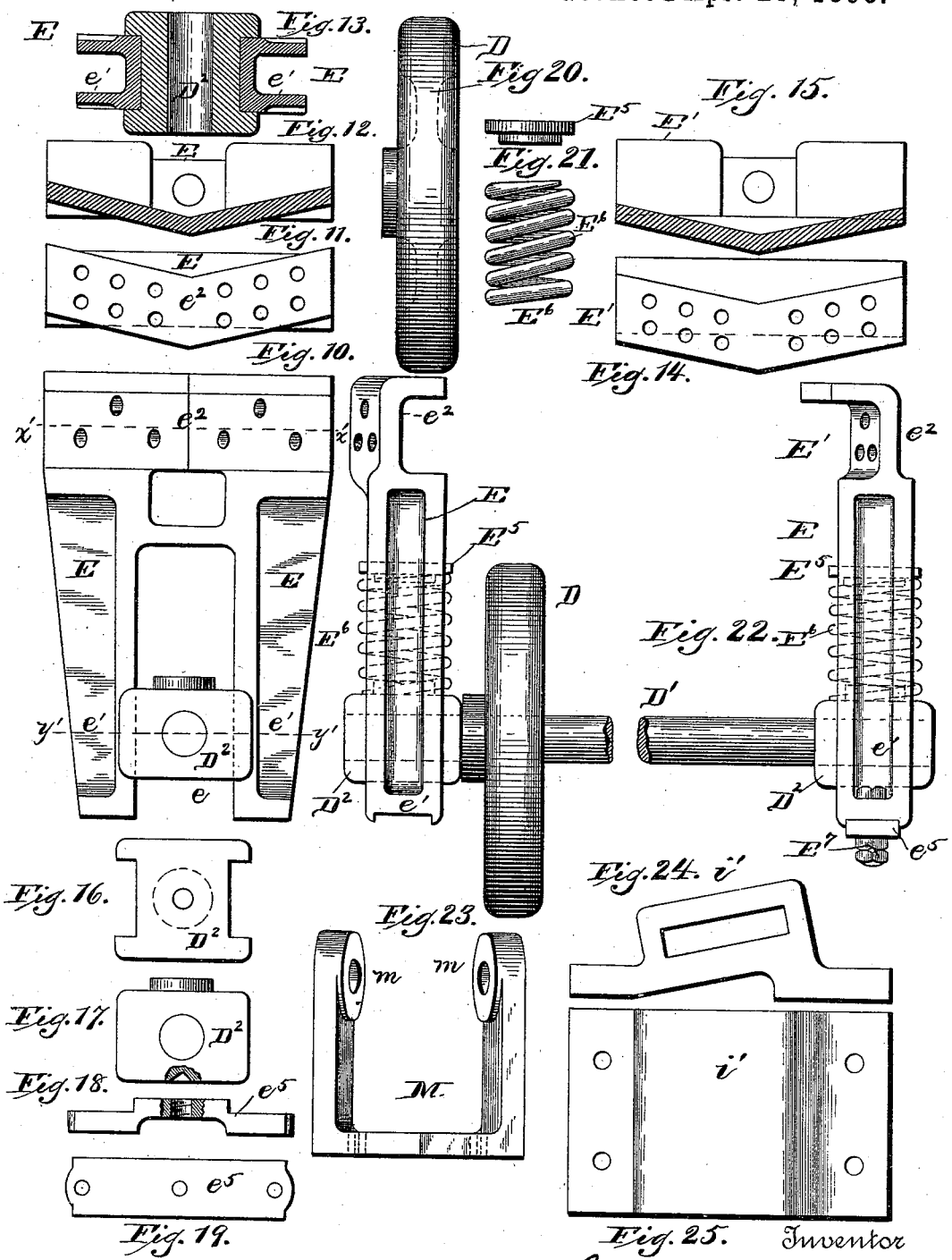

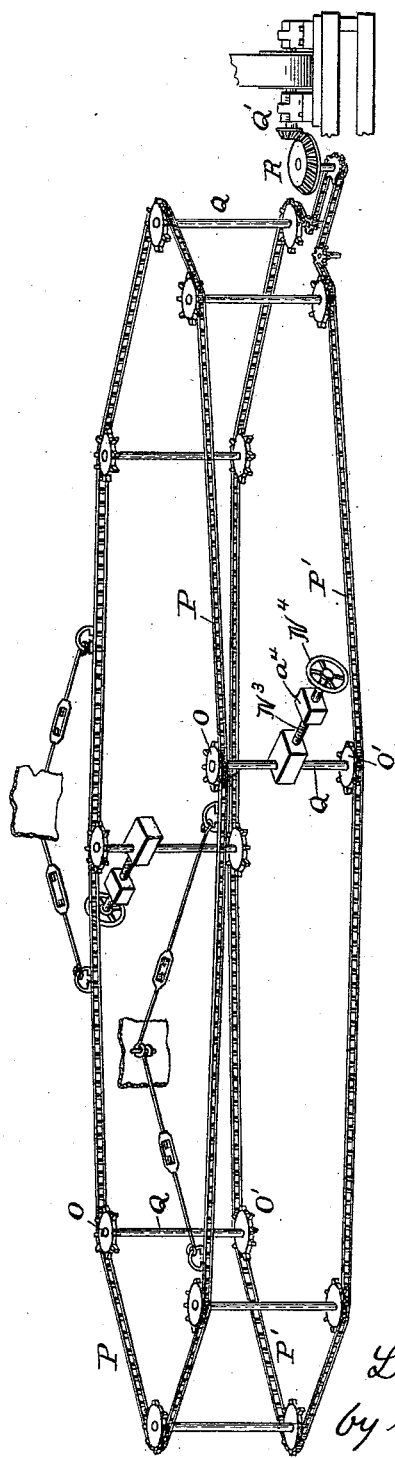

UNITED STATES PATENT OFFICE.

LYMAN D. HOWARD, OF COLUMBUS, OHIO, ASSIGNOR TO JOSEPH A. JEFFREY, OF SAME PLACE.

CONVEYER.

SPECIFICATION forming part of Letters Patent No. 538,111, dated April 23, 1895.

Application filed February 28, 1891. Serial No. 383,212. (No model.)

*To all whom it may concern:*

Be it known that I, LYMAN D. HOWARD, a citizen of the United States, residing at Columbus, in the county of Franklin and State of Ohio, have invented certain new and useful Improvements in Conveyers, of which the following is a specification, reference being had therein to the accompanying drawings.

This invention relates to improvements in mechanisms for transporting from one place to another bodies or masses of such nature that they cannot be transported by the devices ordinarily used for such purposes, such as the heated ores from ore roasters, and other materials.

Figure 1:
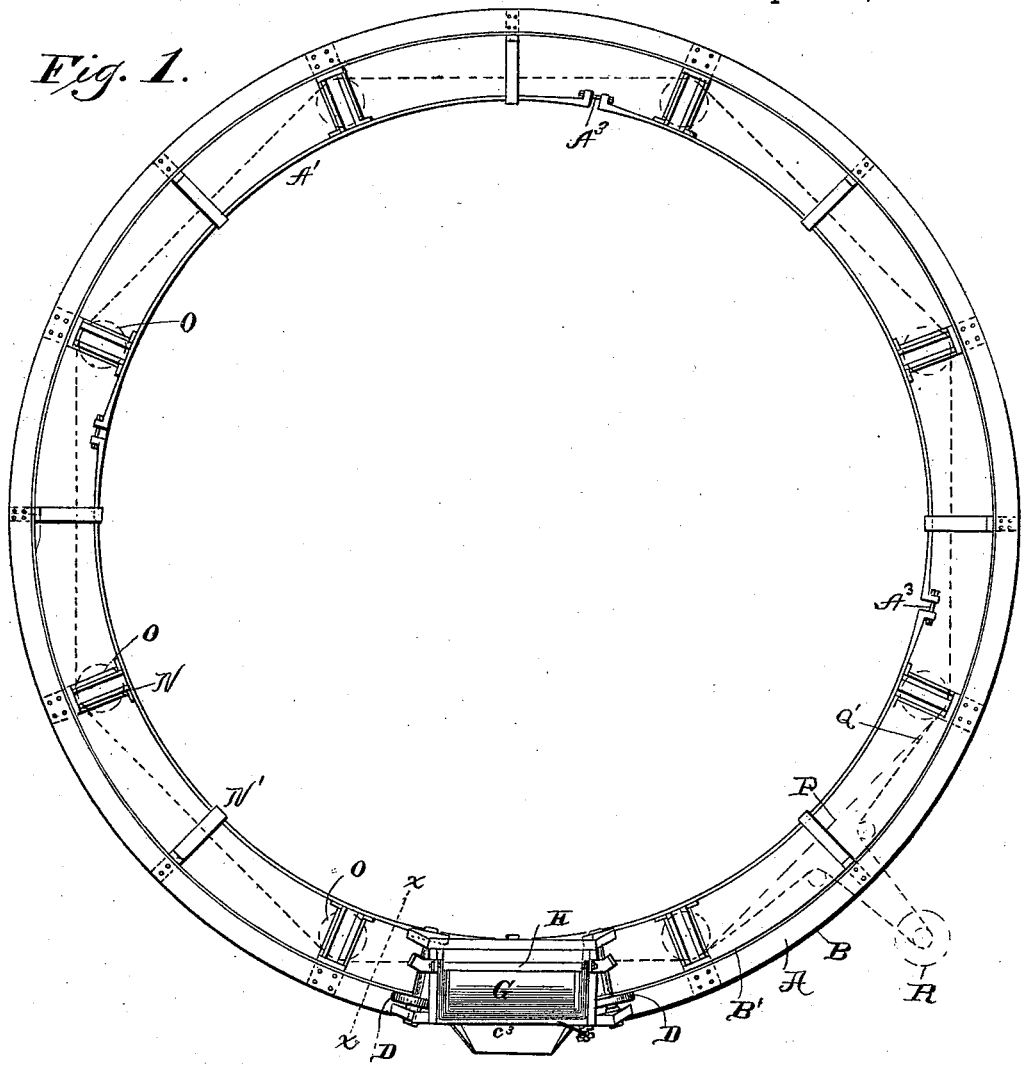
Figure 2:
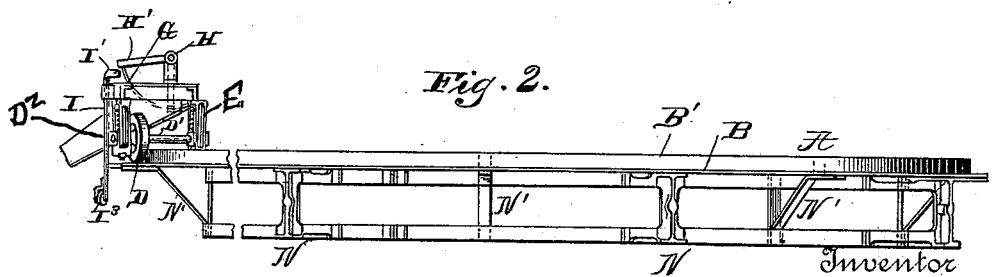
Figure 8:
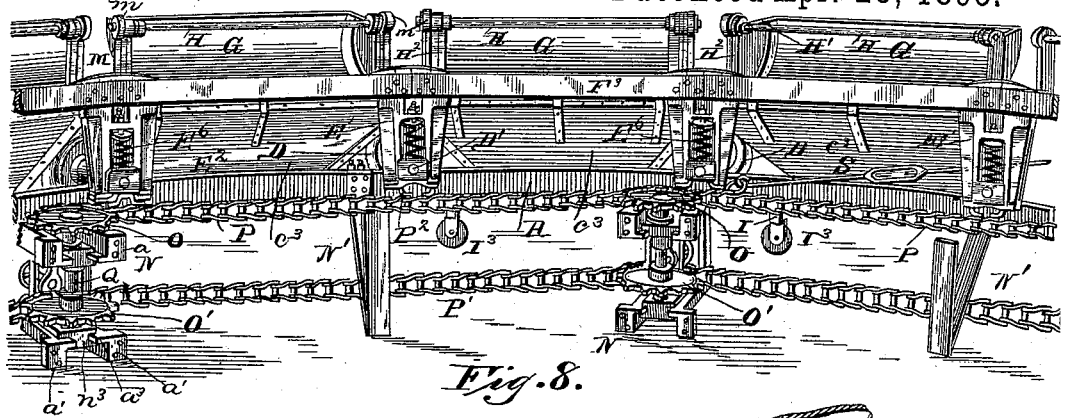
Figure 9:
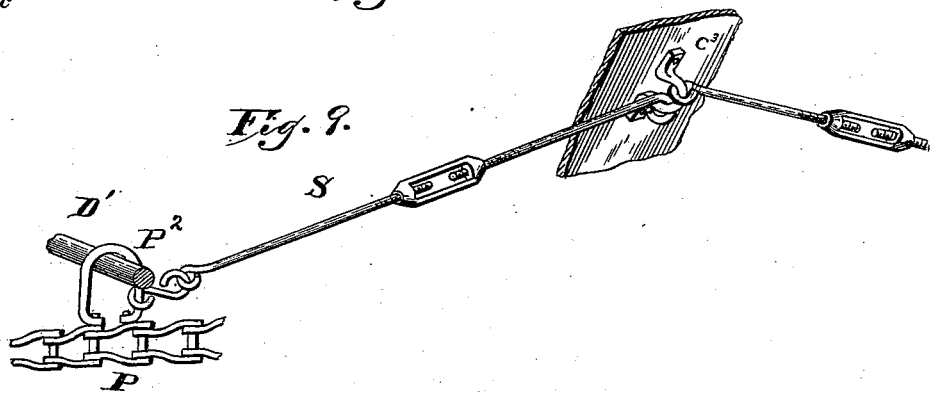

Figure 1 is a plan view of the track or supporting devices on which rest the cars or carriers, it showing also the relations of the track to some of the other parts of the mechanism, one of the cars being shown in place. Fig. 2 is a side elevation of the parts shown in Fig. 1. Fig. 3 is a plan view of one of the hoppers or compartments detached, on an enlarged scale. Fig. 4 is a side elevation of the same. Fig. 5 is a vertical section on the line $x, x$ Fig. 1, on an enlarged scale. Fig. 6 is a vertical section on the line $y, y$, Fig. 5. Fig. 7 is a horizontal section on the line $z, z$, Fig. 5. Fig. 8 is a view from the inside of a part of the series of hoppers or compartments. Fig. 9 shows one form of draft connection between the drive chain and the conveyer. Figs. 10, 11, 12 and 13 are respectively a side elevation, a top plan, a section on line $x', x'$, and a section on line $y', y'$, of one of the outer brackets for supporting a wheel axle. Figs. 14 and 15 are a top plan view and a cross section corresponding to Figs. 11 and 12, but of one of the inner axle supporting brackets. Figs. 16, 17, 18 and 19 show the axle box in plan and side view, and the cross bar at the bottom of the standard or bracket in Fig. 10. Fig. 20 shows one of the supporting wheels. Fig. 21 shows the spring for the wheel axle and its top plate. Fig. 22 shows the wheel, its axle and inner and outer axle supporting brackets. Fig. 23 is a view of one of the rock shaft standards. Figs. 24 and 25 are a top view and a face view of one of the guides for a trip bar. Fig. 26 is a perspective illustrating conventionally the primary and secondary driving chains, when arranged as in Fig. 1. Figs. 27 and 28 are a plan and a side view showing a modification of the arrangement of the track and driving chains.

I have shown the conveyer as being applied to use in carrying materials in a circular path, as for instance around a roasting furnace; and I will describe the construction shown in the drawings when used for that purpose, but do not limit the features of the invention to such use. It is assumed that the furnace here in use has stationary hearths to which access is had and from which the delivery can be effected through a series of doors in the sides. Around the furnace I place a series of cars, carriers, or conveyer sections, which are preferably so connected together or to a common propelling device as to form practically a continuous structure adapted to revolve or move upon a track. Such a track is shown at A, having bottom plate B, and vertical flange B'. This track may be supported in any simple way. The preferred manner is shown, there being two or more bands A', A², secured to the outer walls of the furnace. The bands are formed in the sections which are tightly joined at the ends by clamps A³. See Fig. 1. To these rings are secured brackets, commonly indicated by N, N'. Each bracket N comprises a top horizontal part $a$, a bottom part $a'$, and a vertical connection part $a^2$, the horizontal portions $a, a'$, being bolted to the rings A' A² and having inwardly turned guide flanges A³. See Figs. 5, 6 and 7. In the guides provided by the parts $a^3$ there is fitted an adjustable bearing piece indicated by N², it having top and bottom arms $n, n'$, and a vertical connecting bar $n^2$, there being bearings $n^3, n^3$ at the inner ends to support shafts and wheels to be hereinafter described.

The bearing support N², can be adjusted by screw rod N³, which has a collar or head at $n^4$ engaging with vertical bar $n^2$, and a hand wheel N⁴. $a^4$ is a nut detachably seated in an aperture in the vertical part $a^2$ of bracket N.

Of the track supporting brackets N, there may be as many as are required. Eight are shown in the present case. See Fig. 1. Intermediate of these are supplemental brackets N', which may be of any suitable character and of a number requisite to properly support the track.

Each of the aforesaid compartments, or conveyer sections C is provided with a rolling support, comprising one or more wheels D, and axles D' for each section. Ordinarily I find that one wheel and one axle for each are sufficient, and construct and mount the frame thereon as follows:

E, indicates a standard having a guide way $e$ between the parts $e'$, $e'$, and the top connecting part $e^2$, the latter being formed in two portions inclined to each. See Fig. 11. Of these there are eight shown in the construction illustrated, the shape of the part $e^2$ being made to conform to the required circle. E' is also a standard situated on the radial line of the standard E, it having a guide way $e$ similar to that above described. The upper end of this inner standard E' is shaped somewhat differently from the upper end of that at E, as will be seen by comparing Figs. 14 and 15 with Figs. 11 and 12, the difference being that the angle in the part at the top is greater.

The standards E', E', are secured together by a bar $E^3$, see Figs. 3 and 5, and at the bottom they are connected by the axle D'. This axle is mounted in boxes or bearing blocks $D^2$, mounted in the aforesaid guide way $e$, and having springs $E^2$ above them, the tension of which can be adjusted by means of screws $E^4$, bearing against the plates $E^5$. The blocks or boxes $D^2$ can be prevented from dropping below a desired point by means of adjusting screws $E^7$, which pass through the bottom cross bars $e^5$. It will be seen that the axle D' is supported by these devices in such way as to permit the standards E, E', and the parts carried thereby to rise and fall freely.

There are sixteen pairs of the standards E E', and upon each pair there is supported one of the cars or conveyer sections. $F^2$ is an angle-iron extending from one of the standards E to the other, and $F^3$ is a corresponding angle-iron inside of that at $F^2$ and secured to the uprights E' E'. It will be seen that a pair of these bars $F^2$ $F^3$, together with a pair of those at $E^3$, constitute a rectangular frame, see Fig. 3, which acts to support the wheel-carrying devices above described and also to support a car or conveyer section.

In the construction shown, each section of the frame-work is rigidly secured to the next, all of the parts of the frame being rigid around the entire hexagon.

Each of the hoppers or compartments C comprises a bottom wall or chute $c^3$ and side walls $c^4$ $c^4$, together with a gate or delivery device, in conjunction with the above-described parts of the frame. The slide or bottom $c^3$ is inclined suitably, and extends to a point sufficiently far outside of the body of the car.

It will be noticed that the heated ore is received from the door (as at W) of the roasting furnace, into the cars or conveyer sections successively. As it drops, it is guided by the apron-like plate F, and slides down until it rests against a gate, trap or door G. This is inclined or preferably circular in section, see Fig. 5, and is supported by a rock-shaft at H by means of arms H'. When shaft H is rocked, door G turns up, and the material in the car or conveyer will immediately escape through the chute or trough. By making the part G circular in section and concentric with shaft H, it can be easily moved from below and in front of the load, as it has practically no lifting whatever to accomplish. It can be thrown up by hand or automatically. As shown, it is moved automatically as follows: I is a vertically sliding bar or plate supported in guides at $i$, $i$, secured to the car. To it is attached a chain $I^2$ which is in turn secured to the door or gate G, preferably at the lower or inner edge, see Fig. 5, and if bar I be raised it will cause the lifting of part G. $I^3$ is a roller on bar I adapted to strike an inclined surface at J, which is placed suitably near the point of delivery. As the heat to which such cars or conveyers is subjected is very great, and as consequently there is liability of such expansion and contraction as to speedily impair the mechanism, I interpose layers of asbestos, as shown at L, between the parts most exposed to the heat to provide for expansion and contraction and prevent the rivets and bolts from being loosened or broken.

The aforesaid rock-shafts H are mounted in standards M, having eyes $m$, each standard resting upon and secured to two of the said cross bars $E^3$ $E^3$.

A conveyer or carrier of the sort above described can be moved by the following devices:

Returning to the standards N and the adjustable bearing bars $N^2$, it will be seen that in the bearings $n^3$ $n^3$ of each standard there is mounted an upright shaft Q which is provided with a sprocket wheel O at the upper end, and another, O', at a lower place. There are eight of these sprocket wheels O, and all lie in substantially the same horizontal plane.

P is a drive chain engaging with each of the said wheels and held thereon as taut as possible, this chain assuming the form of an octagon. For some purposes this chain can be driven direct; but where exceedingly heavy loads are to be carried, the strain is so great and so unevenly distributed that it becomes difficult to drive the conveyer in that manner. I employ another chain, as shown at P', which engages with the lower wheels O' above described, and to which the power is initially imparted.

The upper chain P is connected to the conveyer structure above at as many points as are found desirable. As shown, detachable draft rods S are used which may be connected in any suitable way to the chain P and to the conveyer. At each axle D', there is a loop P² which surrounds said axle and is fastened to the chain. This loop may be utilized for securing the draft rods S, or the latter may be secured to the chain at points intermediate of the axle if desired. The loops P² are adapted to slide back and forth upon their respective axles, which sliding becomes necessary, as will be seen upon inspection of Fig. 1. The fastened ends of the loops must keep in the vertical planes of the chain links, and as these links are successively at greater and less distances from the center of the apparatus, the loops must be allowed to conform to such movement. The conveyer sections do not follow a path similar to that of a chain, the latter being octagonal, while the former approximates a circle. The compensation which I thus provide is of such nature that the structure even when very large and heavily loaded maintains almost perfectly the desired position in relation to the center, although there is no centering mechanism introduced, beyond the peculiar arrangement of the primary and secondary driving chains. Were the power to be directly applied to the chain which is connected to the carrier or conveyer, there would be a lateral displacing strain exerted, as is apparent; but by driving a set of primary stationary wheels such as at O', disposed at proper points around the general center, and utilizing these wheels to drive another set of wheels, and in turn by the latter driving a secondary chain which is connected to the carrier, this lateral or displacing strain is obviated practically entirely.

All of the features of this part of the invention are not restricted to the fact that the cars or conveyer sections move in a circular path, as the same principle for applying power can be applied wherever it is required to drive large or heavily laden carrier sections and it is impracticable to employ long shafts. Thus, in Figs. 27 and 28 there is shown a similar arrangement of chains and track for carrying over an elongated path material such as coal and the like.

What I claim is—

1. The combination of the rotary conveyer, the driving chain, and the connecting device P² which joins the conveyer to the chain, and is movable laterally relatively to the conveyer, substantially as set forth.

2. In a conveyer, the combination with the driving chain, the initial power device, the series of wheels driven by said chain, the shafts for said wheels, and the second set of wheels actuated by those aforesaid, of the secondary chain driven by the last said set of wheels, whereby said chain is evenly actuated, substantially as set forth.

3. The combination of the rotary reversible conveyer, the driving chain, the link connecting the chain to the conveyer, and the rod also connecting the chain to the conveyer, but at a different point, substantially as set forth.

4. In a rotary conveyer, the combination with the circular guide or track, the initial driving chain, and the chain driven thereby, of the series of hoppers, and means positively connecting the hoppers to the driven chain, substantially as set forth.

5. In a rotary conveyer, the combination of the hoppers or compartments, the circular track, the chain following substantially the line of the track, the series of wheels for said chain, and means for moving said wheels radially relatively to the central point of the circular track, substantially as set forth.

6. In a rotary conveyer, the combination with the chain, the hoppers or compartments, the circular guide or track, the support therefor, the series of shafts mounted in the said support, and the means for moving said shafts radially relatively to the central point of the said track, substantially as set forth.

7. In a rotary conveyer, the combination of the series of hoppers or compartments, having supporting wheels, the circular guide or track, and the driving chain following the lines of the guide or track, and flexibly connected to the series of hoppers, substantially as described.

8. In a rotary conveyer, the combination with a circular guide or track, and a driving chain following substantially the lines of the track, of a series of hoppers, each having a shaft D' arranged radially relatively to the central point of the track, and the supporting wheels mounted on the said track, substantially as set forth.

9. In a rotary conveyer, the combination of the series of hoppers or compartments, the chain, the curved guide or track, the support therefor, the series of vertical shafts, the bearings for said shafts, the guides in the said supports for the said bearings, and means for moving said guides, whereby the chain may be tightened, substantially as set forth.

10. In a rotary conveyer, the combination with the circular guide or track, and the driving chain following the lines of the track, of the series of hoppers or compartments driven by said chain, they having removable bottoms, and chutes extending to points beyond the vertical planes of the compartments and track, substantially as set forth.

11. The combination of the car having the delivery chute, the swinging trap or discharge door above the chute, the vertically sliding trip-bar, the connecting device between the trip-bar and the door, and means for intermittingly lifting the bar vertically, substantially as set forth.

12. The combination of the car having the delivery chute, the swinging trap or discharge door above the chute, the vertically sliding trip-bar adapted to engage with the said swinging trap or door, and the incline which intermittingly engages with the trip-bar, substantially as set forth.

13. The combination of the hopper, the delivery chute, the rod H, the swinging trap or door pivoted to the said rod, the vertically sliding trip-bar, and the chain connecting the trip-bar and the swinging door, substantially as set forth.

In testimony whereof I affix my signature in presence of two witnesses.

LYMAN D. HOWARD.

Witnesses:
CHAS. W. MILLER,
S. R. MOUNTAIN.